United States Patent
Ziebart et al.

(10) Patent No.: US 11,511,333 B2
(45) Date of Patent: Nov. 29, 2022

(54) SPRING ARM SLEEVE

(71) Applicant: BÖLLHOFF VERBINDUNGSTECHNIK GmbH, Bielefeld (DE)

(72) Inventors: Jan Robert Ziebart, Werther (DE); Bernd Haesler, Halle (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 36 days.

(21) Appl. No.: 16/967,833

(22) PCT Filed: Jan. 8, 2019

(86) PCT No.: PCT/EP2019/050268
§ 371 (c)(1),
(2) Date: Aug. 6, 2020

(87) PCT Pub. No.: WO2019/158274
PCT Pub. Date: Aug. 22, 2019

(65) Prior Publication Data
US 2021/0394255 A1    Dec. 23, 2021

(30) Foreign Application Priority Data
Feb. 13, 2018   (DE) .......................... 102018103124.6

(51) Int. Cl.
*B21J 15/32*    (2006.01)
*B23P 19/00*    (2006.01)
(Continued)

(52) U.S. Cl.
CPC ............. *B21J 15/32* (2013.01); *B23P 19/002* (2013.01); *B23P 19/006* (2013.01); *B25C 1/001* (2013.01); *B25B 23/10* (2013.01); *B25C 3/002* (2013.01)

(58) Field of Classification Search
CPC .... B21J 15/30–32; B25C 1/001; B25C 3/002; B25C 3/006; B23P 19/002; B23P 19/006;
(Continued)

(56) References Cited

U.S. PATENT DOCUMENTS 4,819,856 A * 4/1989 Davern ................... B21J 15/32
                                                              227/119
5,088,942 A    2/1992 Welsh et al.
(Continued)

FOREIGN PATENT DOCUMENTS

DE       8702073 U1 *  6/1987 .............. F16B 13/02
DE       9114434 U1    3/1993
(Continued)

OTHER PUBLICATIONS

Translation of DE202016106666 (Year: 2016).*
Written Opinion & International Search Report for PCT/EP2019/050268 dated Mar. 29, 2019, 11 pages.

*Primary Examiner* — Matthew P Travers
(74) *Attorney, Agent, or Firm* — Reising Ethington P.C.; Matthew J. Schmidt

(57) ABSTRACT

A spring arm sleeve, with which a joining element of a joining device is positionable and which comprises the following features: a tubular section which is formed by a circumferential or all-round wall, the circumferential wall comprises in the circumferential direction a plurality of U-shaped apertures regularly spaced apart from one another, which form a plurality of one-sidedly fastened spring arms which are inclined radially inwards into the tubular section and extend from a fixed end in a first longitudinal direction.

14 Claims, 15 Drawing Sheets

Figure 1:
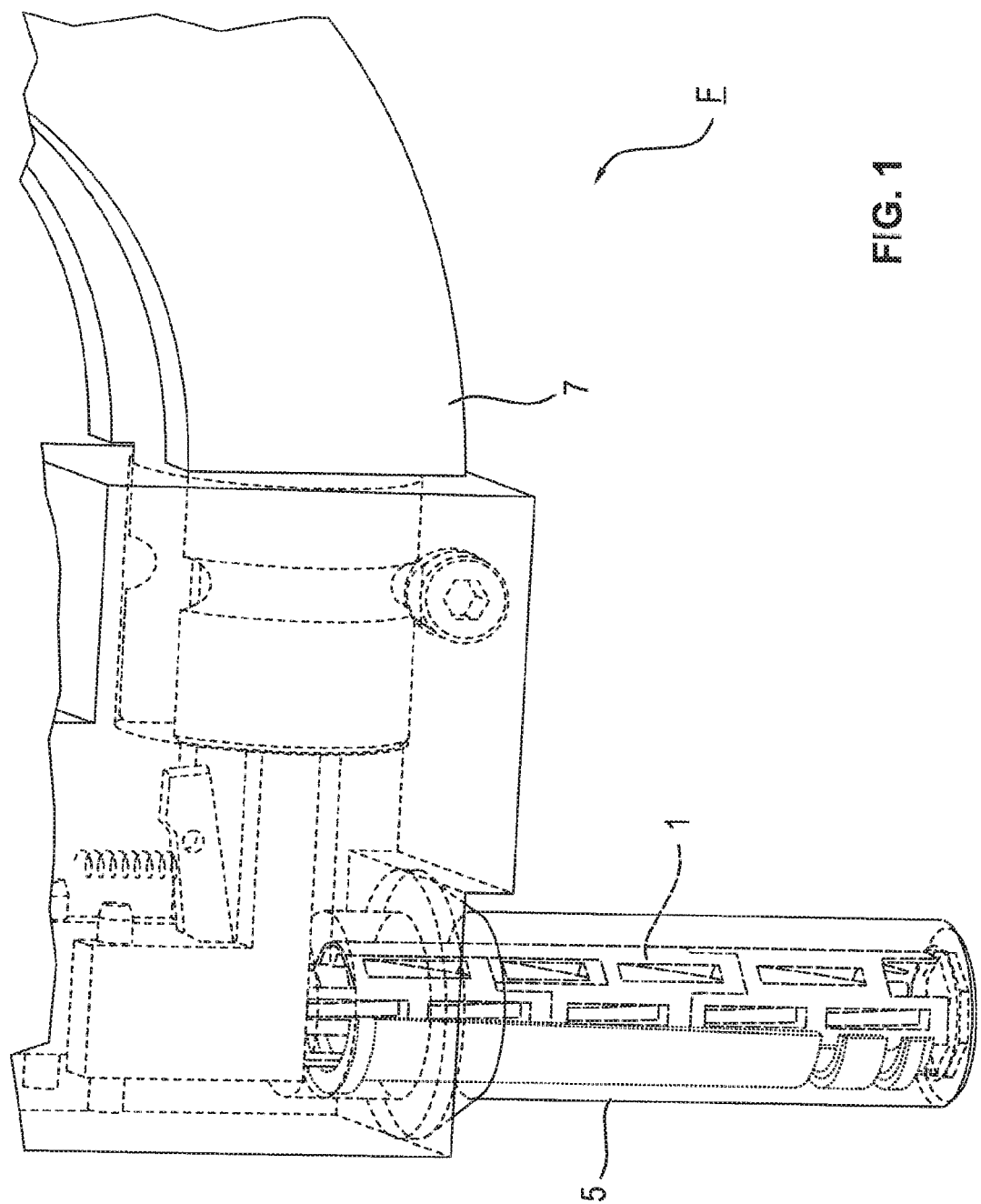

(51) Int. Cl.
 *B25C 1/00* (2006.01)
 *B25B 23/10* (2006.01)
 *B25C 3/00* (2006.01)

(58) Field of Classification Search
 CPC . B25B 23/005; B25B 23/08–10; B25B 3/002;
 B25B 3/006; H01R 3/187; F16B 13/025;
 F16B 21/073
 See application file for complete search history.

(56) References Cited

U.S. PATENT DOCUMENTS

| | | |
|---|---|---|
| 7,985,042 B1 | 7/2011 | Paxton |
| 2009/0133359 A1* | 5/2009 | Kauppila ............... F16B 13/025 403/197 |
| 2011/0023265 A1* | 2/2011 | Singbartl ................ G01P 1/026 16/2.1 |
| 2011/0146456 A1* | 6/2011 | Hain ...................... B23K 9/206 81/55 |
| 2019/0217430 A1 | 7/2019 | Schneider |
| 2021/0148945 A1* | 5/2021 | Blessing .................. G01P 1/00 |

FOREIGN PATENT DOCUMENTS

| | | | |
|---|---|---|---|
| DE | 202007013238 U1 * | 3/2009 | ............ F16B 21/073 |
| DE | 102012024762 A1 | 6/2014 | |
| DE | 202016106666 U1 | 12/2016 | |
| DE | 102016118106 A1 | 3/2018 | |
| EP | 0038396 A1 | 10/1981 | |
| EP | 2187480 A2 | 5/2010 | |
| FR | 2967795 A1 | 5/2012 | |
| JP | 2014213380 A | 11/2014 | |
| WO | WO-9214065 A1 * | 8/1992 | ................ F16B 13/02 |
| WO | WO9908007 A1 | 2/1999 | |
| WO | WO2009097121 A1 | 8/2009 | |

\* cited by examiner

SPRING ARM SLEEVE

1. TECHNICAL FIELD

The present disclosure relates to a spring arm sleeve with which a joining element of a joining device is positionable, a joining device in combination with such a spring arm sleeve, as well as a method for manufacturing such spring arm sleeves.

2. BACKGROUND

Joining elements for manufacturing connections between at least two components are widely used in prior art. These joining elements include punch rivets, setting bolts, screws, nails and the like. With such joining elements, components of the most diverse materials, such as metal, plastic or combinations thereof, are connected. Accordingly, these components have different thicknesses, so that the lengths and geometries of the joining elements used in each case also vary.

In order to be able to set a joining element in at least one component, this joining element must be positioned in the joining direction in front of a punch of the joining device. As soon as the punch moves in the joining direction, this movement is transferred to the joining element and the latter is set into the at least one component. For this purpose, it is necessary to position the joining element reliably in the joining direction in front of the punch so that the punch surface can engage a head of the joining element and drive it into the at least one component.

Since the different joining elements, due to the different cases of application, vary in their geometry, for example in length and diameter as well as in head shape and head dimension, geometric requirements have to be met or provided in order to be able to arrange the joining element appropriately oriented in the joining direction in front of the punch. For this purpose, brake bars which are formed web-like are known in the prior art. These extend in the joining direction in the mouthpiece or joining channel of the joining device and are spring-loaded radially inwards, for example by O-rings. As these brake webs taper the joining channel or the mouthpiece in the joining direction, the fed joining element is inevitably blocked in this brake path until the punch sets the joining element into the at least one component.

In addition to the use of brake webs, the joining channel has also been equipped with brake pads or shoes. For this purpose, the radial inner wall of the joining channel of a joining device is made up of a plurality of pads or shoes that are arranged so as to be movable in a radial direction. By means of a spring preloading of these pads radially inwards, it is ensured that a fed joining element is held clamped in the joining channel. As soon as a joining process begins, the punch moves between these brake pads, thereby pushes the joining element ahead in the joining direction and presses the brake pads radially outwards. Thus these brake pads, just like the brake webs mentioned above, serve to position and arrange the joining element in the joining channel without interfering with the subsequent joining process.

It has proven to be disadvantageous that neither the brake webs nor the brake pads ensure a reliable positioning of the joining element in the joining channel. This is especially the case if the joining element is relatively short compared to its head diameter. In this case, the joining elements tend to tilt within the joining channel, which is not prevented by the brake pads or brake webs. A further disadvantageous feature is that the brake pads and brake webs require a relatively large amount of space, since a sufficiently small tilt radially inwards into the joining channel can only be realized with a minimum length.

Due to the above disadvantages, it is therefore an object of at least some implementations of the present invention to provide a suitable and reliable positioning aid for joining elements in joining devices so that a joining process is not hindered by a possible incorrect positioning of a joining element in the joining channel or below the punch in the joining direction.

3. SUMMARY

The above object is solved by a spring arm sleeve, by a joining device as well as by a manufacturing method. Further designs and further developments of the present disclosure arise from the following description, the accompanying drawings as well as the appending claims.

The spring arm sleeve with which a joining element of a joining device is positionable, comprises the following features: a tubular section which is formed by a circumferential or continuous wall, the continuous or all-round wall having in the circumferential direction a plurality of U-shaped apertures evenly spaced apart from one another, which form a plurality of one-sidedly fastened spring arms which are inclined radially inwards into the tubular section and extend starting from a fixed end in a first longitudinal direction.

The spring arm sleeve has the function of suitably positioning and retaining a joining element close to the underside of a punch of a joining device for the upcoming joining process. For this purpose, the joining element is to be aligned by means of the spring arm sleeve in such a manner that a head upper side, for example the upper side of the head of a punch rivet, is oriented approximately parallel to the adjacently arranged punch side. Correspondingly, at the beginning of a joining process, the punch then takes the joining element over the approximately parallel oriented upper side in joining direction and sets the joining element into the at least one component. For this purpose, the spring arm sleeve comprises a tubular section which is dimensioned in such a manner that the joining element fits through this section despite its radial dimension. Spring arms are provided to narrow the tubular section radially inwards. These spring arms protrude radially inwards in a spring-loaded manner, and may be inclined in the joining direction. In other words, it may be a preferred embodiment of the present disclosure to arrange the spring arms all inclined in the same longitudinal direction of the tubular section. Due to their radially inwardly oriented inclination, the spring arms taper the inner diameter of the tubular section. Accordingly, a joining element is held releasably in the tubular section by the spring force of the several spring arms. The release then takes place by the movement of the punch when the latter moves the joining element, which is resiliently clamped between the spring arms, through the tubular section in the joining direction. In order to define the spring arms mentioned, U-shaped apertures are provided in the radial inner wall of the tubular section. These apertures extend completely through the wall of the tubular section so that the basic configuration of the individual spring arms is created.

According to a further embodiment of the spring arm sleeve, the tubular section comprises a round or polygonal cross-section.

The outer shape of the tubular section can be chosen virtually as desired. It is decisive, however, that the radially inwardly springing spring arms arranged in an inclined manner taper the tubular section in its interior to such an extent that a fed joining element is retained by these spring arms and cannot slide through the tubular section. Since the mouthpiece or the joining channel of common joining devices often comprise a round cross-section, it may be preferable to provide the tubular section with a round cross-section or a uniformly polygonal cross-section. Accordingly, the spring arm sleeve may then also be inserted into a joining channel or mouthpiece of the joining device or arranged directly at the setting head adjacent to the punch underside. At this position, the spring arm sleeve ensures an appropriate positioning and retaining of a fed joining element, which supports a trouble-free realization of the joining process.

A further embodiment is that, in the spring arm sleeve in the first longitudinal direction of the tubular section, at a first length and thereafter at least at a second length, at least three spring arms are respectively arranged evenly spaced from one another in the circumferential direction.

From the configuration described above, it is apparent that there are at least two steps or longitudinal levels within the tubular section, viewed in the longitudinal direction, at which spring arms are arranged on the radially inner side of the tubular section. This stepwise arrangement of a first plurality of spring arms and of at least a second plurality of spring arms ensures that a joining element is retained at the first step of spring arms or at least, if this should not succeed, at the second step of spring arms. Furthermore, this stepwise arrangement of the spring arms in different length ranges of the tubular section ensures that the joining element continues to be supported in its position by the spring arms even during the movement of the punch in the joining direction.

According to a further embodiment, the at least three spring arms of the first length and the at least three spring arms of the second length are arranged at equal or same circumferential positions with respect to each other. According to a further embodiment of the spring arm sleeve, the at least three spring arms of the second length are arranged at circumferential positions which are located between the at least three spring arms of the first length.

According to a first embodiment of the spring arm sleeve, the several spring arms are arranged at the above mentioned steps evenly distributed on the radial inner side of the tubular section in the circumferential direction. The even arrangement ensures that the spring arms evenly distributed around the joining element to be positioned or retained correspondingly apply resilient retention forces. In this way it may be avoided that the spring arms engaging at the joining element disturb a positioning in the center of the tubular section and in a suitable orientation to the punch underside.

Since a plurality of spring arms may be arranged on several steps, floors or levels or after several length sections with respect to the length of the tubular section, the spring arms of adjacent steps are arranged according to different alternatives. A first alternative is that the spring arms of adjacent steps are arranged at the same circumferential position. This means that, when viewed in the longitudinal direction of the tubular section, a plurality of spring arms are arranged one after another in the longitudinal direction. In this context, however, it also may be preferred that the spring arms of adjacent steps are arranged radially offset to each other. Accordingly, the spring arms of the subsequent step may be arranged in the interspace of the previous step. This ensures an additional safety when positioning and/or retaining the joining element within the spring arm sleeve.

According to a further embodiment, the tubular section of the spring arm sleeve comprises a cross-section of a regular, at least hexagonal even polygon in which the spring arms are arranged at even polygon sides or faces at the first length and at odd polygon sides or faces at the second length.

The embodiment just summarized may realize the above-described step-shaped arrangement of the spring arm sleeves. A polygonal cross-section of the tubular section is used as a positioning aid for this purpose. This polygonal cross-section should comprise at least six corners, wherein an even number of corners of the polygon may be preferred. An even number ensures that a polygon face can remain free between two adjacent spring arms in a radial plane. With this arrangement, an option is then that in the subsequent step of the spring arms, the spring arms are arranged at the polygon faces where previously, at the same circumferential position, a free face or surface between two adjacent spring arms had been selected.

Of course, it may also be preferred to provide the tubular section with an odd-numbered polygonal cross-section. In this context it is advantageous if each polygonal face comprises a spring tongue. Otherwise, the spring arms will be unevenly distributed along the circumferential direction, which could possibly lead to disturbances when positioning and retaining the joining elements in the tubular section.

According to a further embodiment of the spring arm sleeve, the first length and the second length as well as the length of the spring arms are selected in such a manner that the spring arms of the first length and the spring arms of the second length overlap each other in the longitudinal direction of the tubular section.

During the feeding of a joining element for manufacturing a connection or for positioning below the punch, it is sometimes necessary that a joining element is transferred from the spring arms of the first step to the spring arms of the next or adjacent step. In order to avoid a sudden transfer with possibly disturbing radially inwardly directed spring stresses, the length of the spring arms of the two adjacent steps is selected in such a manner that these spring arms overlap each other in the longitudinal direction of the tubular section. In this way, the joining element may slide from a retaining spring tension portion of the spring arms of the first step into a retaining mechanical tension portion of the spring arms of the second step. Accordingly, the joining element within the tubular section is thus held almost continuously by the different spring arms of the adjacent steps during its longitudinal movement through the spring arm sleeve. It is understood that because the spring arms which are not identically adjustable and act radially inwards, certain fluctuations are possible in the mechanical stresses directed radially inwards. However, these do not endanger the basic concept described above for retaining and positioning the joining element within the spring arm sleeve.

According to a further embodiment, the spring arm sleeve is comprised of at least two axial sleeve sections which are arranged axially adjacent to each other. These sleeve sections may be retained within the joining channel or mouthpiece of a setting tool or, more generally, a joining device.

A further embodiment of the spring arm sleeve is that at one or both axial ends of the spring arm sleeve, regularly arranged clearances are provided adjacent to strip-like end portions. With respect to this construction, according to a further embodiment, the spring arm sleeve is comprised of at least two sleeve sections, the axial ends of which are arranged in a nested manner with the regularly arranged clearances and the adjacent strip-like end portions. In this way, an arrangement of the sleeve sections is ensured within the joining channel or, for example, a mouthpiece, which are mutually supported on one another in the circumferential direction and also in the longitudinal direction. This ensures a reliable position of the spring arm sleeve especially during a plurality of joining processes.

According to a first embodiment, the circumferential or all-round wall is formed closed. In a second embodiment, the circumferential or all-round wall is formed discontinuously.

The present disclosure also includes a joining device with a mouthpiece, in particular a setting device for punch rivets or bolts, wherein a spring arm sleeve according to one of the embodiments described above is arranged inside the mouthpiece.

Joining devices are generally known. In this context, especially setting devices for punch rivets, such as solid punch rivets or semi-hollow punch rivets may be preferred. However, the present application of the spring arm sleeve also refers to bolt guns, which are widely used in the automotive industry as well as in the construction industry.

According to a further embodiment of the joining device, the latter comprises a mouthpiece with a joining channel which, adjacent to an end in a joining direction, comprises a radially inwardly projecting retaining collar on which the spring arm sleeve is supported in the axial direction.

The present disclosure also includes a manufacturing method for a spring arm sleeve, in particular a spring arm sleeve according to the embodiments described above. This manufacturing method comprises the following steps: providing a plane or planar element having a plurality of U-shaped apertures evenly or regularly spaced apart from each other which form a plurality of one-sidedly fastened spring arms which extend from a fixed end in a first longitudinal direction, deforming the planar element into a tubular section which defines a passage channel, and deforming the spring arms radially inwards into the passage channel so that they are arranged in an inclined manner.

From the above manufacturing method, it is apparent that a planar element provides the initial form for the manufacturing of the tubular section. This planar element may be made of different materials, such as a spring sheet, metal in general, plastic or a metal-plastic composite. Other material designs are also possible as long as they ensure the configuration of radially inward arranged spring arms.

The above-mentioned planar element is formed into the appropriate shape using suitable methods, such as sheet metal bending or hot forming of plastics, so that it provides a tubular section. However, before manufacturing this tubular section, the U-shaped cut-outs may be made in the existing planar element. This is because these cut-outs ensure that the spring arms projecting radially inwards can be formed later. In a final step, the radially inwardly projecting spring arms may then be configured so that they narrow the passage channel of the tubular section.

According to a further embodiment of the manufacturing method, the planar element is a spring sheet which is laser-cut or etched or punched. The methods mentioned here, i.e. laser cutting, etching as well as punching are known methods for material processing.

According to a further embodiment of the manufacturing method, the tubular section is deformed in such a manner that it comprises a hexagonal or octagonal uniform cross-section.

In addition, the manufacturing method may comprise the following step: bending the spring arms radially inwards into the passage channel.

Based on the method steps described above, it is apparent that although the present manufacturing method makes use of classic processing options, for example for metals, these options then lead to the specific shaping of the spring arm sleeve.

According to another design of the present manufacturing method, the above-mentioned planar element may be made of plastic. This may also be laser-cut or etched or punched in order to then manufacture the spring arm sleeve from this.

In a further embodiment of the manufacturing method, the tubular section is formed by a circumferential or all-round wall. In a first alternative, the circumferential wall is formed closed. In a second alternative, the circumferential wall is formed discontinuously.

4. BRIEF DESCRIPTION OF THE ACCOMPANYING DRAWINGS

Figure 2:
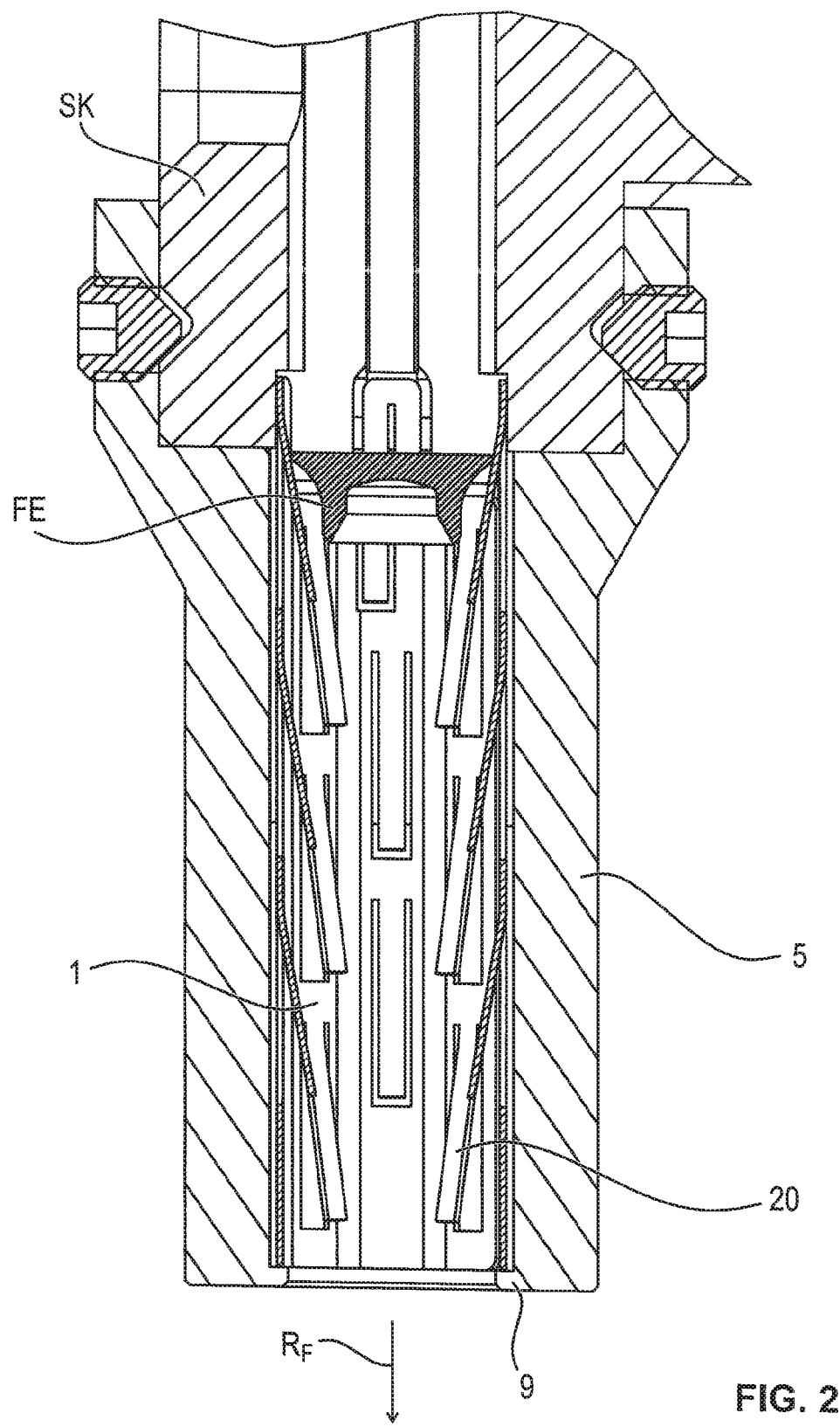
Figure 3:
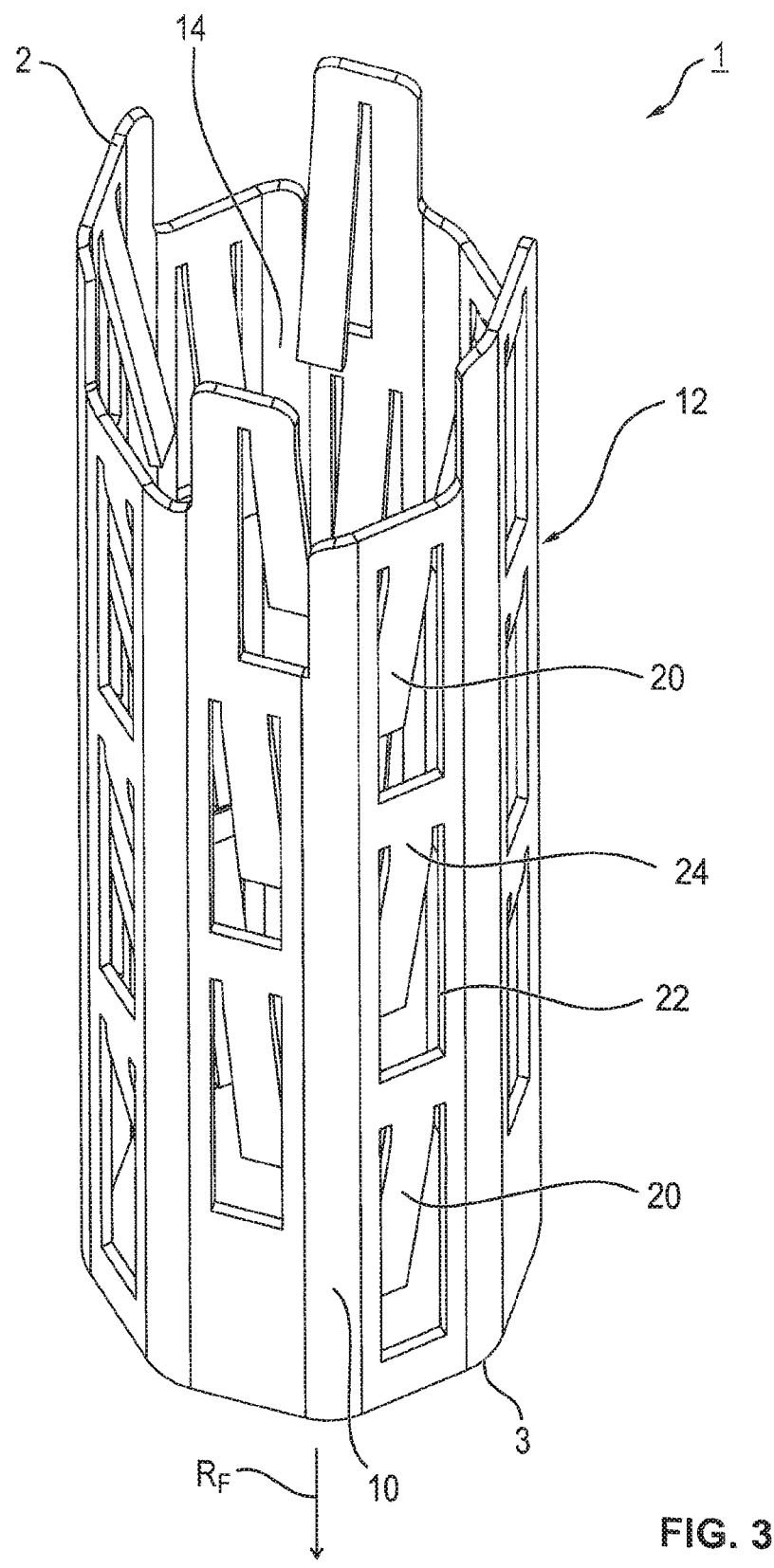
Figure 4:
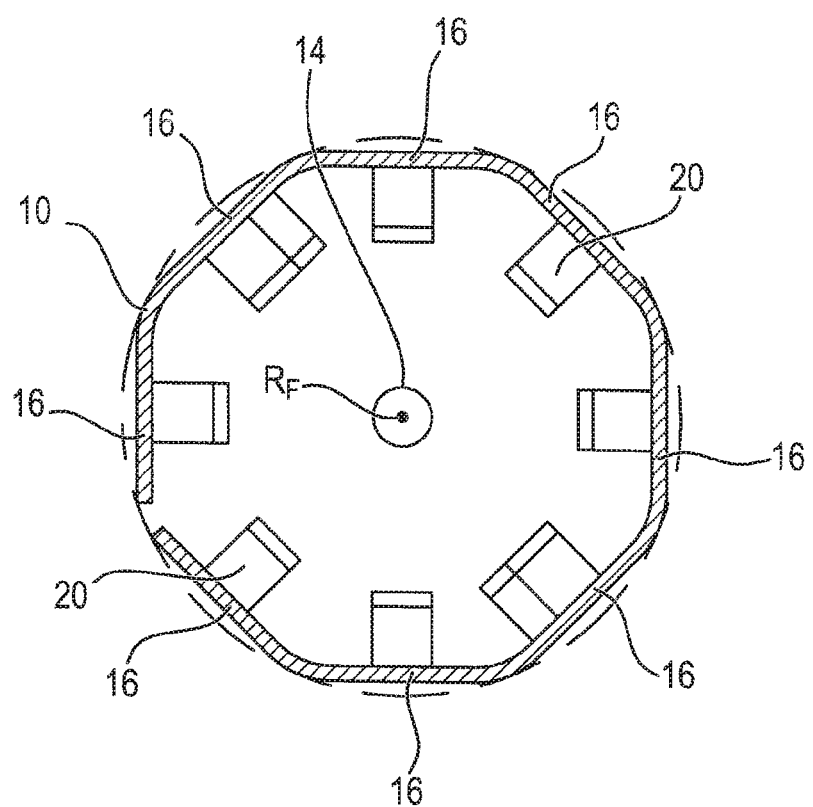
Figure 5:
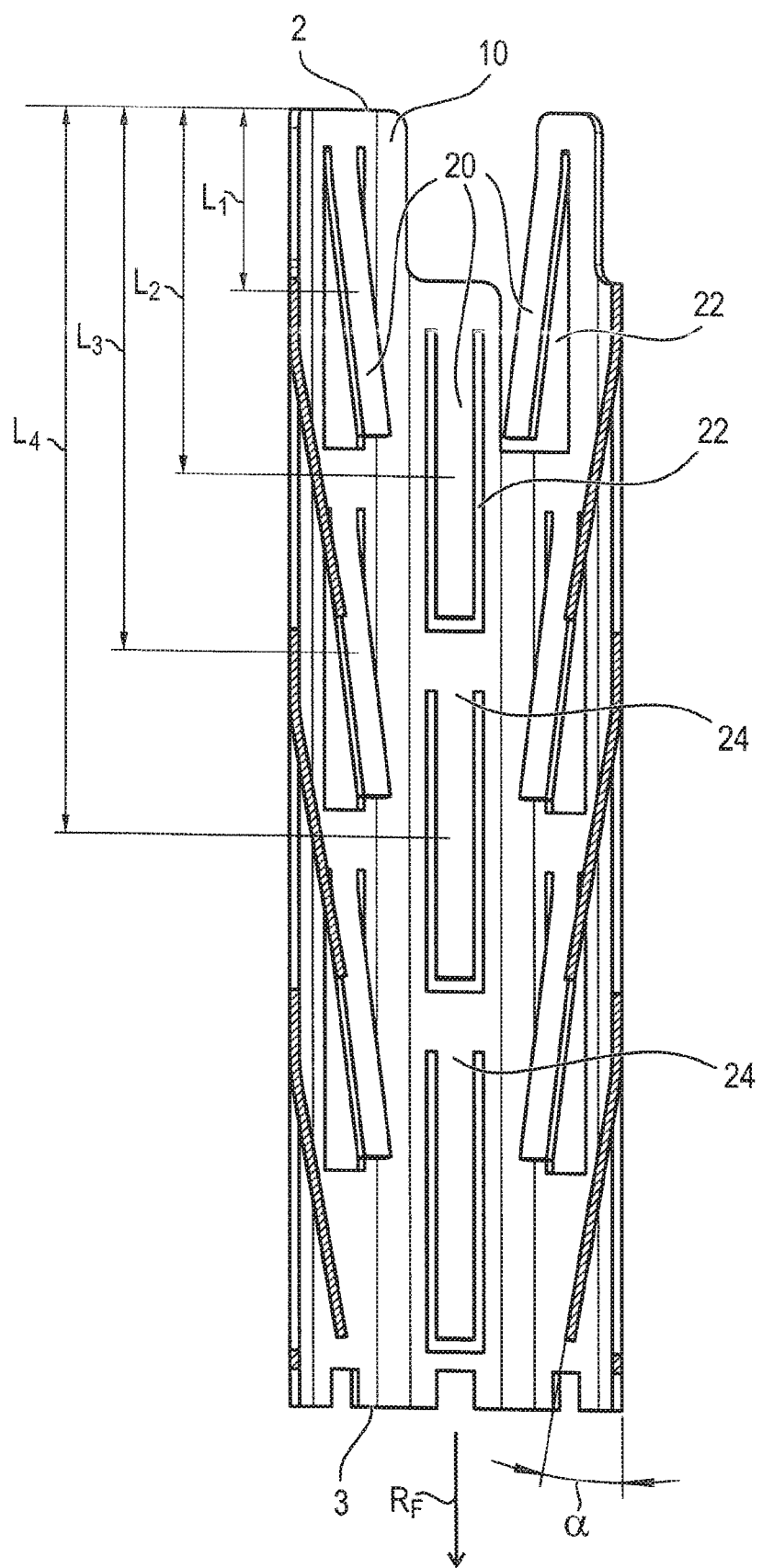
Figure 6:
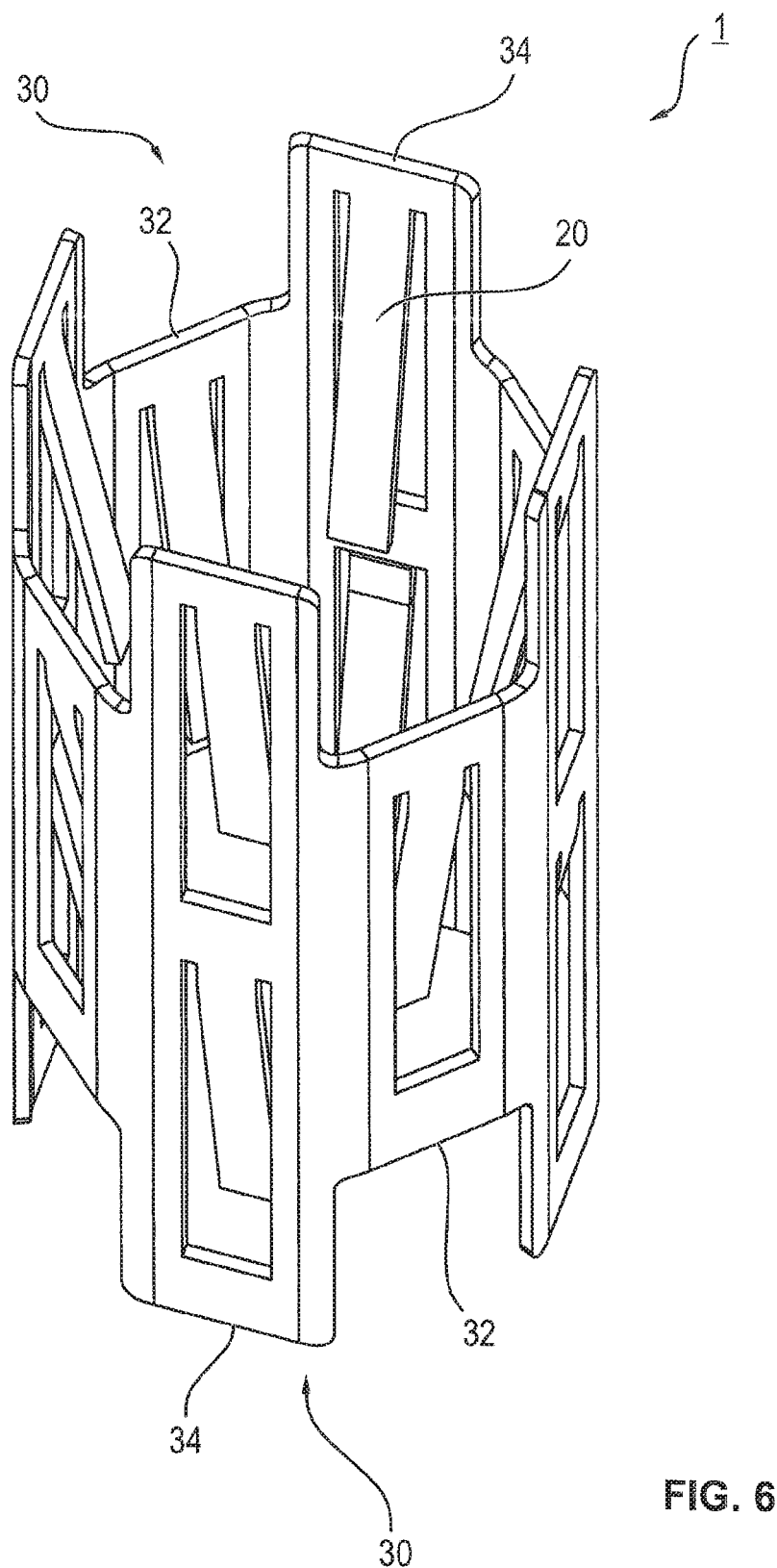
Figure 7:
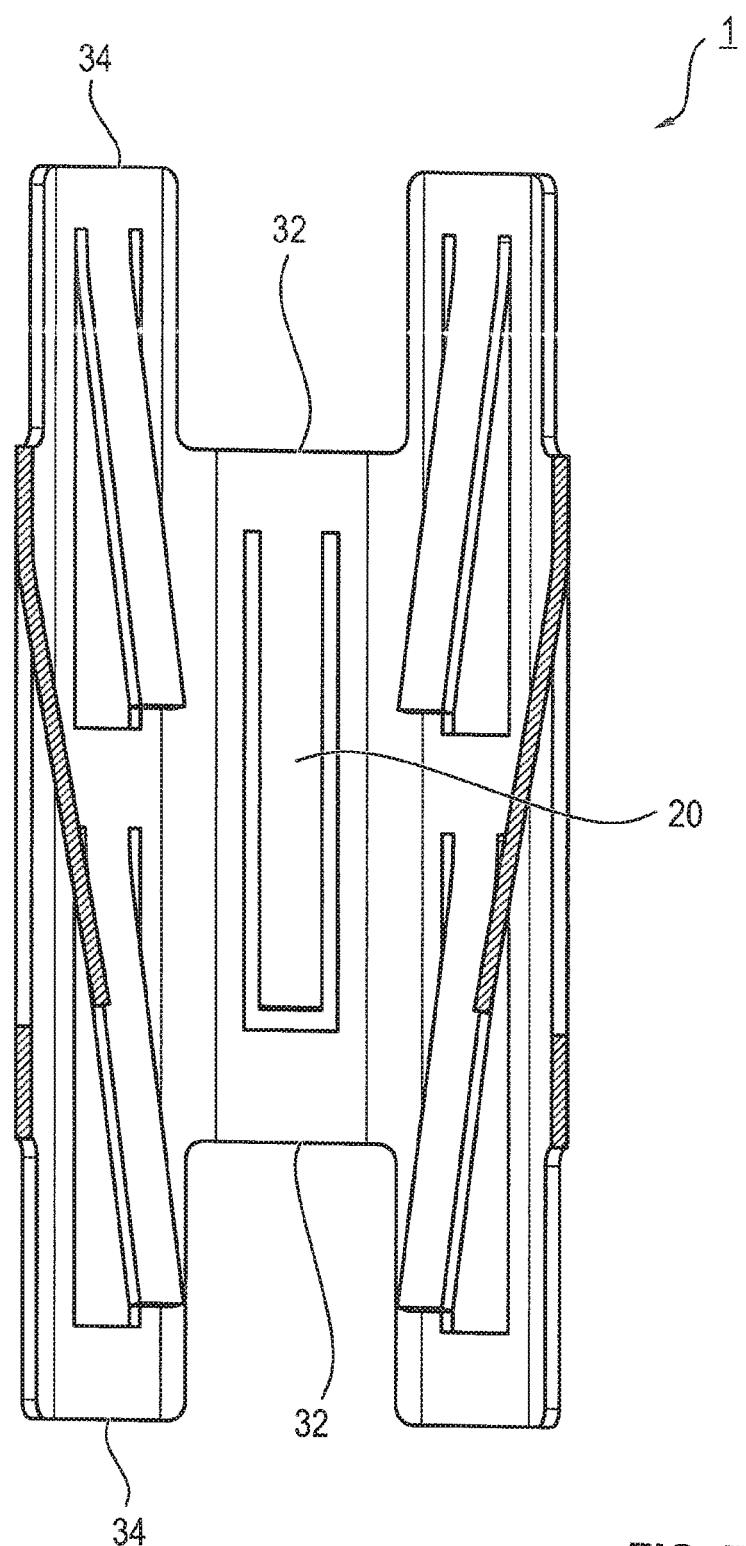
Figure 8:
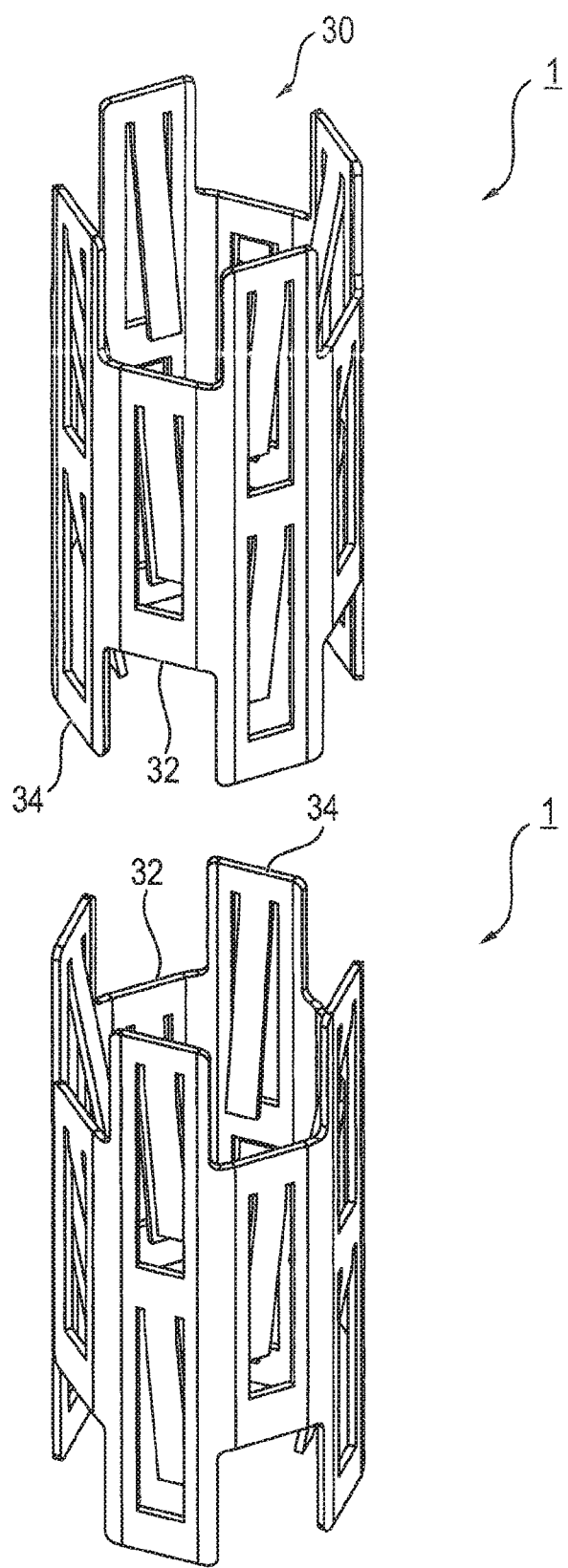
Figure 9:
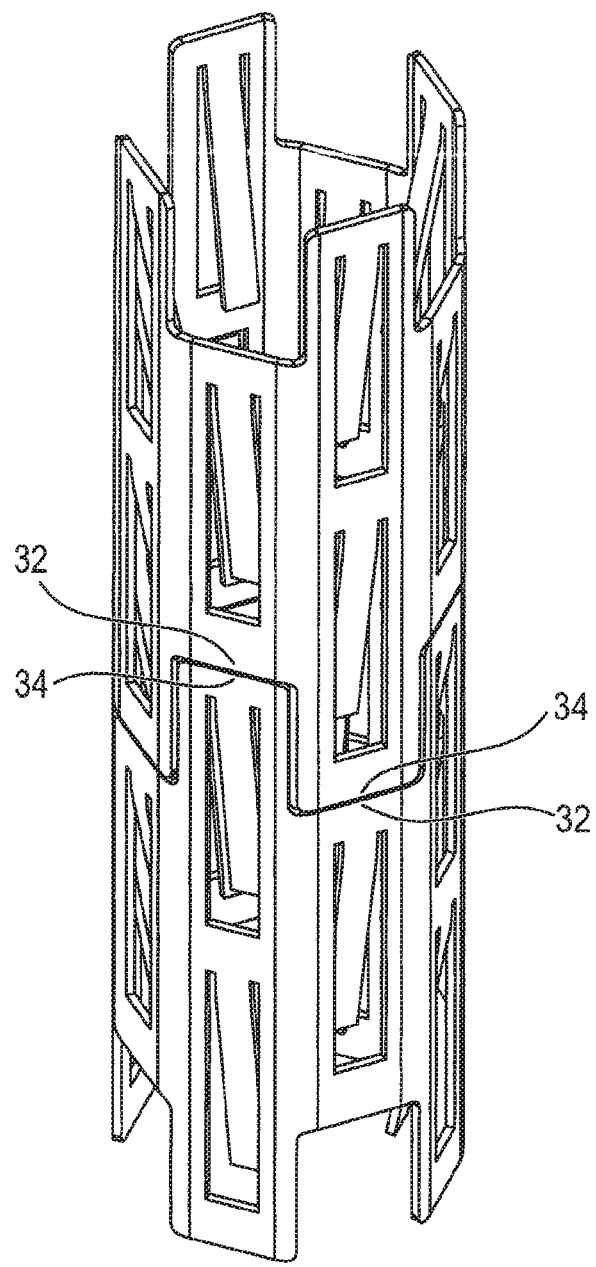
Figure 10:
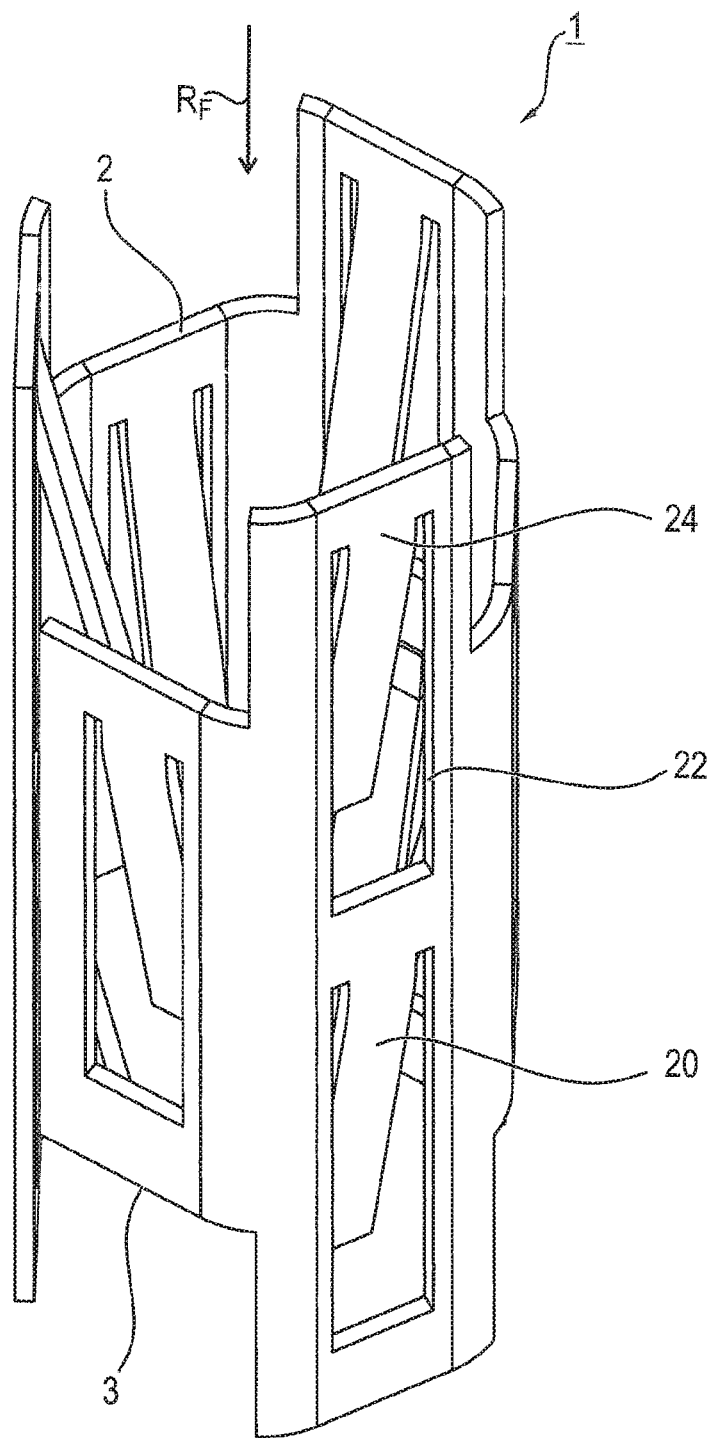
Figure 11:
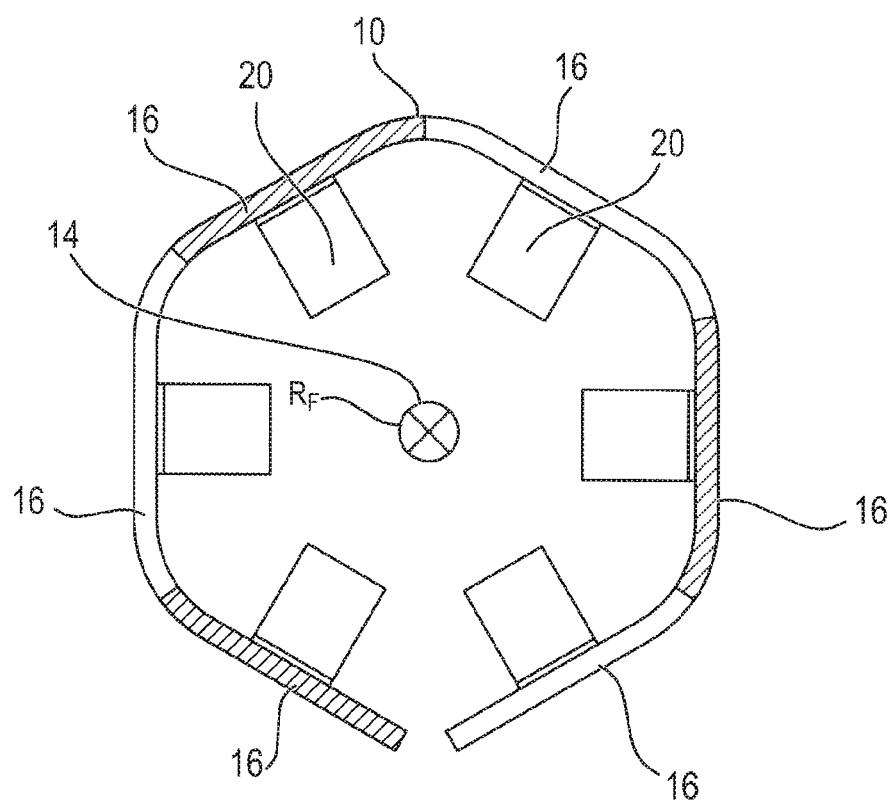
Figure 12:
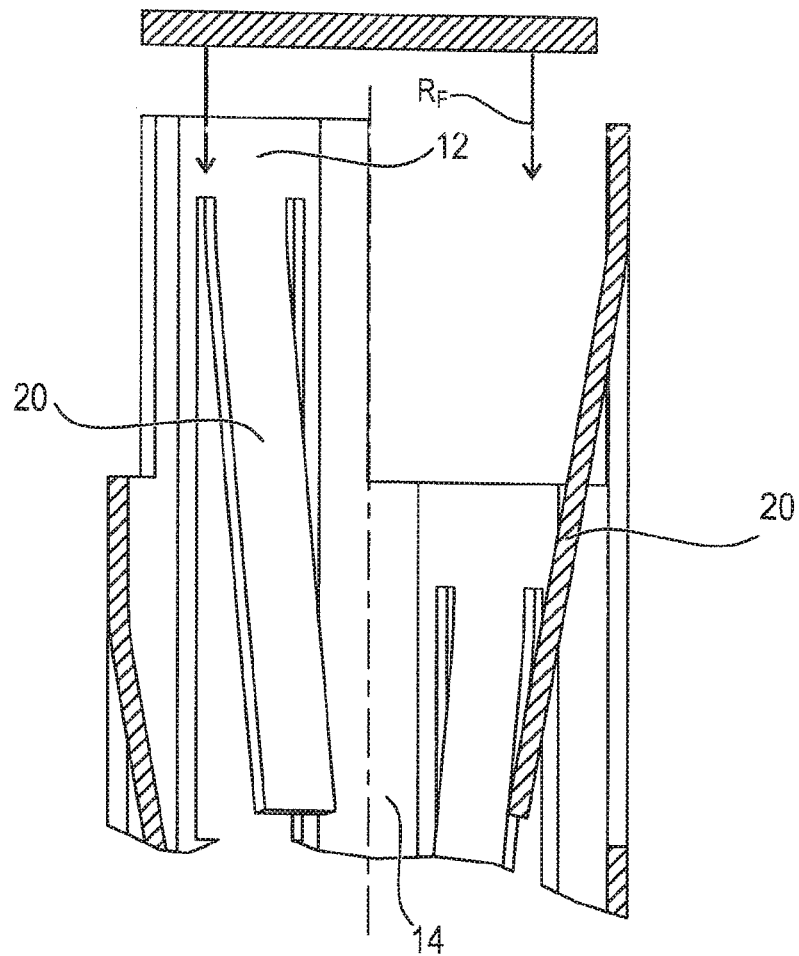
Figure 13:
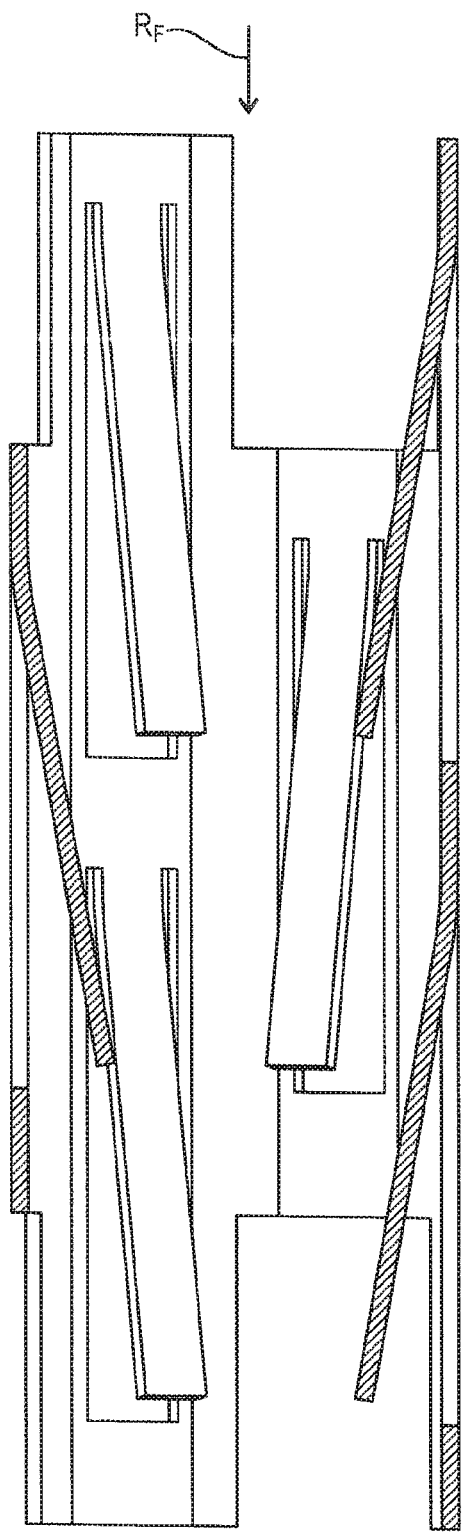
Figure 14:
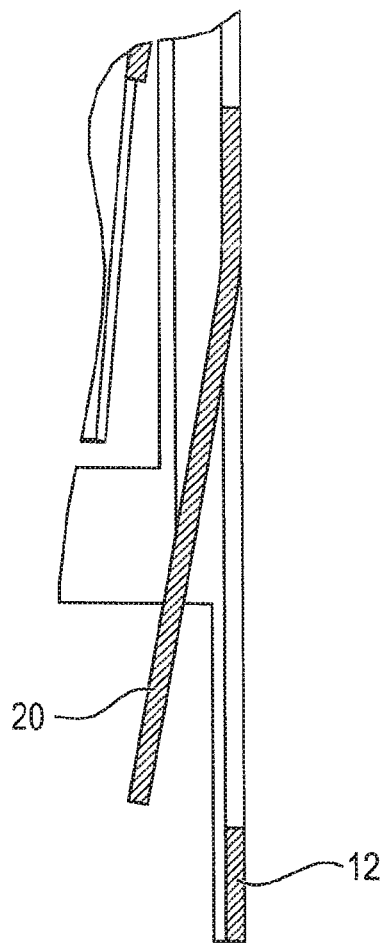
Figure 15:
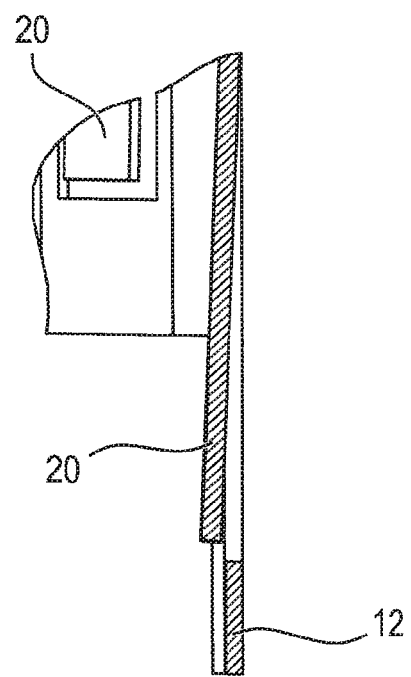
Figure 16:
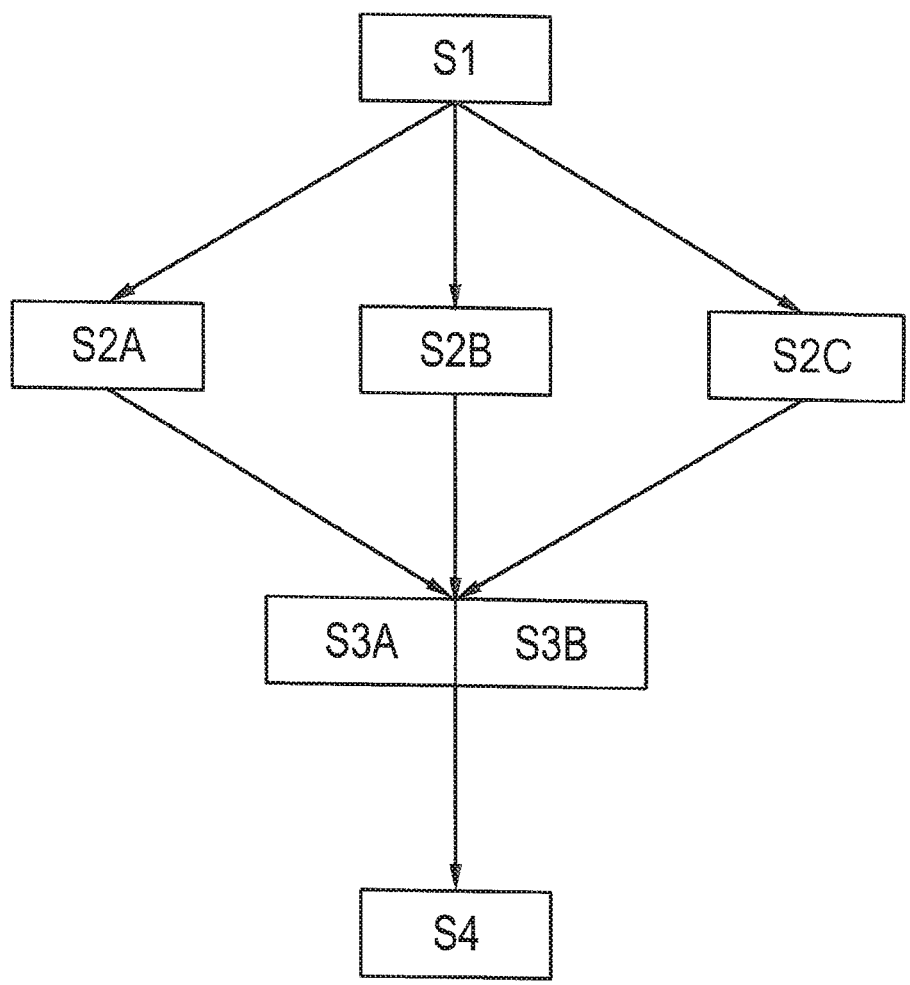

The embodiments of the present disclosure are described in more detail with reference to the accompanying drawings. Showing:

FIG. 1 an exemplary schematic illustration of an element feed of a joining device, in which an embodiment of the spring arm sleeve is arranged in the joining channel or in the mouthpiece, FIG. 2 a sectional view through a joining channel with a spring arm sleeve arranged therein according to an embodiment, FIG. 3 a perspective view of a spring arm sleeve, FIG. 4 a radial sectional view of the spring arm sleeve of FIG. 3, FIG. 5 an axial sectional view of the spring arm sleeve of FIG. 3, FIG. 6 a perspective view of another embodiment of a spring arm sleeve, FIG. 7 an axial sectional view of the spring arm sleeve of FIG. 6, FIG. 8 a perspective illustration of two spring arm sleeves, which are combinable with each other as one common spring arm sleeve, FIG. 9 the spring arm sleeves of FIG. 8 in a combined arrangement, in which they may also be receivable in a joining channel of a joining device, FIG. 10 a perspective view of a further embodiment of a spring arm sleeve, FIG. 11 a radial sectional view of the spring arm sleeve of FIG. 10, FIG. 12 an illustration regarding the movement of a joining element through a spring arm sleeve, FIG. 13 a partial sectional view of an embodiment of a spring arm sleeve, FIG. 14 an enlarged view of a spring arm in an initial position, FIG. 15 an enlarged view of a spring arm in a radially outwardly deflected position; and, FIG. 16 a flow chart of an embodiment of a manufacturing method of the spring arm sleeve.

5. DETAILED DESCRIPTION

The spring arm sleeve 1 may be arranged in a mouthpiece or joining channel 5 of a joining device F. FIG. 1 shows a partial view of the joining devices F, showing an element feed 7 adjacent to an entry into the joining channel 5. The sleeve-like constructed spring arm sleeve 1 (see below) is retained within the joining channel 5 such as by a radial frictional connection with the radial inner wall of the joining channel 5.

According to another arrangement of the spring arm sleeve 1 in the joining channel or mouthpiece 5, the spring arm sleeve 1 is supported at a radial collar 9. The radial collar 9 can also be seen in the sectional view of FIG. 2. The radial collar 9 is arranged adjacent to the exit of the joining channel 5. Since the radial collar 9 projects into the joining channel 5 radially inwards, circumferentially continuous or all-round, it may reduce the passage openings through the joining channel 5.

At this radial collar 9 an exit end 3 of the spring arm sleeve 1 is supported so that the latter cannot be pressed out of the joining channel 5 by a punch or a joining element FE during a joining process.

While the spring arm sleeve 1 with the exit end 3, when viewed in the joining direction $R_F$, is supported at the radial collar 9, it may also be preferred to fasten the spring arm sleeve 1 with an entry end 2 to the setting head SK. This fastening may be made by a frictional connection or a latching connection or a similar construction.

According to a further embodiment (not shown) of the spring arm sleeve 1, the latter is directly connected to the setting head SK of the joining device F without the joining channel 5. Accordingly, the spring arm sleeve 1 replaces the joining channel 5 and ensures a reduced interference contour of the joining devices F.

FIGS. 3 and 10 show perspective views of different embodiments of the spring arm sleeve 1. The spring arm sleeve 1 is formed by a circumferential or all-round wall 10 which is shaped into a tubular section 12. The tubular section 12 defines a passage channel 14, through which the joining element FE moves according to FIG. 2. The circumferential or all-round wall 10 is formed closed according to a first alternative. According to a second alternative, the circumferential or all-round wall is formed discontinuously.

According to further embodiments, the tubular section 12 comprises different cross-sectional shapes. According to a design (not shown), the tubular section 12 has a round outer contour. Further, the tubular section 12 may be provided with a polygonal outer contour (see FIGS. 4 and 11). As can be seen from the further description, the outer contour has an even polygonal shape, i.e. an even number of side faces or surfaces can be seen in the cross-section of the spring arm sleeve 1. It is also possible to provide a polygonal shape with an odd number of side faces or surfaces. In FIG. 4, the polygonal cross-section has eight side faces 16 or polygonal faces 16, while in FIG. 11 six polygonal faces 16 can be seen.

As can be seen in the perspective views, e.g. of FIGS. 3 and 10, the spring arm sleeve 1 may be constructed in a floor-like or level-like manner in the joining direction $R_F$ or viewed in longitudinal direction. In this context, a level denotes a first length $L_1$ measured from the entry end 2 of the spring arm sleeve 1. At this first length $L_1$ or on this first level and optionally at further following lengths $L_2$, $L_3$, $L_4$ or levels, several spring arms 20 are arranged evenly distributed around the circumference of the tubular section 12. The spring arms 20 are fastened one-sidedly and arranged in an inclined manner into the passage channel 14. As it is apparent from the Figures, all spring arms 20 are arranged in an inclined manner in the joining direction $R_F$.

The spring arms 20 may be surrounded on three sides by a continuous U-shaped aperture 22 through the circumferential or all-round wall 10. Correspondingly, each spring arm 20 is connected with the wall 10 at only one side 24.

An arrangement of the spring arms 20 is described with reference to the first length $L_1$ or the first level of the spring arm sleeve 1. As can be seen from FIG. 4, the tubular section 12 may comprise the polygonal cross-section with eight polygon faces 16. At the first length $L_1$, which may be measured at the center of the spring arm 20, a U-shaped aperture 22 and thus a spring arm 20 is arranged in the circumferential direction only on every second polygon face 16. Correspondingly, the spring arms 20 are arranged on the radially inner side of the tubular section 12 evenly distributed in the circumferential direction.

On the next length $L_2$ following in the joining direction $R_F$ or on the second level, the same number of spring arms 20 may be arranged on the radial inner side of the tubular section 12 as on the first level $L_1$. However, the spring arms 20 of the second level or length $L_2$ are arranged exactly at the polygon faces 16 at which no spring arms 20 are arranged in the first level $L_1$.

In addition, it may be preferred that, viewed in the joining direction $R_F$, the spring arms 20 of the second level $L_2$ with their connection 24 to the wall 10 already begin before an end of the spring arms 20 of the first length $L_1$ or level is reached. In this way, a nested arrangement of the spring arms 20 of adjacent lengths $L_1$, $L_2$ etc. or adjacent levels results.

Since the spring arms 20 of the individual levels are arranged inclined into the passage channel 14, a joining element FE moving through the passage channel 14 is retained almost continuously by the spring arms 20. This may ensure that the orientation of the joining element FE is maintained during its movement in the joining direction $R_F$ through the passage channel 14.

In this context it may also be preferred to adjust the axial position and inclination of the spring arm 20 in order to achieve an optimum guidance of the joining element FE.

According to a further embodiment, one spring arm 20 is provided on each polygon face 16 of the same level. Accordingly, the same arrangement of the spring arms 20 would follow on the next level in the joining direction $R_F$. With this arrangement, there is no nested arrangement of the spring arms 20 (not shown).

Furthermore, it may be preferred to leave clear at least one polygon face 16 between two adjacent spring arms 20 on adjacent levels, respectively, despite the same arrangement of the spring arms 20.

In summary, it may therefore be advantageous to have at the first length $L_1$ or on the first level and then at least the second length $L_2$ or on the second level, at least three spring arms 20, respectively, arranged evenly spaced from each other in the circumferential direction. These at least three spring arms 20 in the first level and in the subsequent second level are arranged at equal or same circumferential positions in comparison to each other. In contrast to this, in the other design the spring arms 20 of the second level are arranged at circumferential positions at which, in the first level, precisely no spring arms 20 have been provided.

FIG. 5 shows that the spring arms 20 are arranged inclined at an angle α radially inwards in the passage channel 14. The angle α may be in a range of $5° \leq \alpha \leq 20°$, or $5° \leq \alpha \leq 15°$ or $5° \leq \alpha \leq 10°$. Depending on a length of the spring arm 20 and its spring properties due to the selected material of the spring arm sleeve 1, the angle α is adjustable to guide and/or position and/or brake the joining element FE.

According to the embodiment of the joining device F shown in FIG. 2, the spring arm sleeve 1 in the joining channel 5 is comprised of an axially continuous tubular section 12. This may be adapted to the length of the joining channel 5 or to the length of a braking and/or positioning distance.

According to the embodiments shown in FIGS. 6-9, the spring arm sleeve 1 in FIG. 9 is comprised of a plurality of spring arm sleeves 1, here two spring arm sleeves 1. This construction method provides the flexibility that different lengths of joining channels 5 can be equipped with a basic spring arm sleeve 20 by multiple combinations.

The basic spring arm sleeve 20 shown in FIGS. 6 and 7 comprises a nested arrangement of the spring arms 20 as has been described above. In addition, the basic spring arm sleeve 1 can comprise a polygonal cross-section with 6 or 8 or more polygon faces. This said nested arrangement of the spring arms 20 forms the basis for a stepped contour 30 of the wall 10 at the entry and/or exit end of the basic spring arm sleeve 1. The stepped contour 30 is comprised of alternating clearances 32 and strip-like end portions 34. By means of the step contour 30, several spring arm sleeves 1 can be inserted into each other and arranged in the joining channel 5. This can be seen in FIG. 1, for example, where three spring arm sleeves 1 are arranged in the joining channel 5. For this purpose, the strip-like end portions 34 of the one spring arm sleeve 1 engage in the clearances 32 of the other adjacent spring arm sleeve 1. The several spring arm sleeves 1 thus support each other in the joining channel 5.

If the joining element FE moves in the joining direction $R_F$ into the entry end of the spring arm sleeve 1, as shown schematically in FIG. 12, it meets the spring arm 20. The spring arms 20 narrow the passage channel 14 with their resilient arrangement and inclination into the passage channel 14 of the tubular section 12. Accordingly, the joining element FE is first stopped and positioned in the passage channel 14 by the spring arm 20 in a clamping or frictional or non-positive manner. The uniform distribution of the spring arms 20 in the circumferential direction of the passage channel 14 ensures that the joining element FE may be arranged with its side arranged opposite to the joining direction $R_F$, for example the head upper side of a punch rivet, parallel or at least approximately parallel to a punch underside of the punch of the joining device F. This supports a suitable positioning of the joining element FE for the joining process. While the joining element FE is moved in the joining direction $R_F$ by the spring arm sleeve 1, the spring arms 20 yield resiliently radially outwards. This is illustrated in FIGS. 14 and 15. After passing the joining element FE, the spring arms 20 spring back radially inwards to brake or decelerate and/or position the next joining element FE.

With reference to the flow chart in FIG. 16, further alternatives of the manufacturing method for the spring arm sleeve 1 are described. In a first step S 1, a planar element is first provided from which the tubular section 12 is later to be formed. This planar element may be made of metal, for example spring steel. According to a further embodiment, the planar element is made of plastic. Depending on the joining process to be supported by the spring arm sleeve 1, different material alternatives for manufacturing the spring arm sleeve 1 may thus be used.

In step S2, corresponding to the chosen material alternative, several U-shaped apertures 22 regularly spaced apart from one another are provided in the planar element to form the spring arms 20 from these. According to process step S2A, it may be preferred to manufacture the apertures 22 by laser cutting. According to another embodiment, in step S2B the apertures 22 are etched. A further embodiment is that the apertures 22 in the planar element are manufactured by punching (step S2C).

After the planar element has been provided with the apertures 22, in a subsequent step S3 the planar element is deformed into the tubular section 12 with passage channel 14. According to an embodiment of this method step, the deforming is carried out under the supply of heat (see step S3A). It may also be preferred to bring the planar element into the appropriate shape by bending (step S3B). Of course, this bending in step S3B can also be supported by the supply of heat.

Based on the different embodiments of the spring arm sleeve 1 described above, it is understood that the tubular section 12 can comprise different cross-sectional contours after the deformation step. Thus, according to the different embodiments, it is intended to provide the deformed planar element, i.e. the tubular section 12, with a round or hexagonal or octagonal uniform cross-section.

In a final step S4, the spring arms 20 are deformed radially inwards into the passage channel 14. This deformation may include the step of bending in the case of a metal planar element. In the same way, it is possible to bring the spring arms 20 into the appropriate configuration by using heat, especially if the planar element is made of plastic.

The invention claimed is:
1. A spring arm sleeve with which a joining element of a joining device is positionable and which comprises the following features:
   a. an entry end, an exit end and a tubular section which is formed by a circumferential wall, wherein the tubular section defines a first longitudinal direction,
   b. the circumferential wall comprises in a circumferential direction a plurality of U-shaped apertures regularly spaced from one another,
   c. wherein the plurality of apertures forms a plurality of one-sidedly fastened spring arms which are inclined radially inwards into the tubular section, in which
   d. in the first longitudinal direction of the tubular section,
      d1. at a first length at least three spring arms are arranged in the circumferential direction evenly spaced from one another and
      d2. at at least one second length different from the first length at least three spring arms are arranged in the circumferential direction evenly spaced from one another, wherein
   e. the first and the second length are measured between the entry end of the spring arm sleeve and a center of the respective spring arms and
   f. each spring arm extends toward the exit end starting from a respective fixed end in the first longitudinal direction;
   wherein the at least three spring arms of the second length are arranged at circumferential positions which are located between the at least three spring arms of the first length, and
   the first length and the second length as well as a length of the spring arms are selected in such a manner that the spring arms of the first length and the spring arms of the second length overlap each other in the longitudinal direction of the tubular section.
2. The spring arm sleeve according to claim 1, in which the tubular section comprises a round or polygonal cross-section.
3. The spring arm sleeve according to claim 1, in which the tubular section comprises a cross-section of a regular at least hexagonal even polygon, in which the spring arms of the first and the second length are arranged at every other side.

4. The spring arm sleeve according to claim 1, which is comprised of at least two axial sleeve sections which are arranged axially adjacent to each other.

5. The spring arm sleeve according to claim 1, which comprises at one of the entry and the exit end or at the entry and the exit end regularly arranged clearances adjacent to strip shaped end portions.

6. The spring arm sleeve according to claim 5, which is comprised of at least two sleeve sections, wherein axial ends of the at least two sleeve sections have the regularly arranged clearances and the adjacent strip shaped end portions arranged in a nested manner.

7. The spring arm sleeve according to claim 1, in which the circumferential wall is formed closed.

8. The spring arm sleeve according to claim 1, in which the circumferential wall is formed discontinuously.

9. A joining device with a mouthpiece, wherein a spring arm sleeve according to claim 1 is arranged inside the mouthpiece.

10. The joining device according to claim 9, in which the mouthpiece comprises a joining channel which, adjacent to an end in a joining direction, comprises a radially inwardly projecting retaining collar on which the spring arm sleeve is supported in the axial direction.

11. A manufacturing method for a spring arm sleeve according to claim 1, comprising the following steps:
 a. providing a planar element with a plurality of U-shaped apertures regularly spaced from one another, which form a plurality of one-sidedly fastened spring arms which extend starting from a fixed end in a first longitudinal direction,
 b. deforming the planar element into a tubular section which defines a passage channel; and
 c. deforming the spring arms radially inwards into the passage channel so that they are arranged in an inclined manner.

12. The manufacturing method according to claim 11, in which the planar element is a spring sheet which is laser cut or etched or punched.

13. The manufacturing method according to claim 12, in which the tubular section is deformed in such a manner that it comprises a hexagonal or octagonal uniform cross-section.

14. The manufacturing method according to claim 11, in which the planar element is a plastic element which is laser cut or etched or punched.

\* \* \* \* \*